Feb. 3, 1931.  A. KÖNIG  1,790,926
MICROSCOPE OBJECTIVE
Filed Feb. 7, 1929
|       | I      | II     | III    | IV     |
|-------|--------|--------|--------|--------|
| $n_D$ = | 1.5311 | 1.7174 | 1.5311 | 1.6088 |
| $\nu$ = | 62.1   | 29.5   | 62.1   | 58.9   |
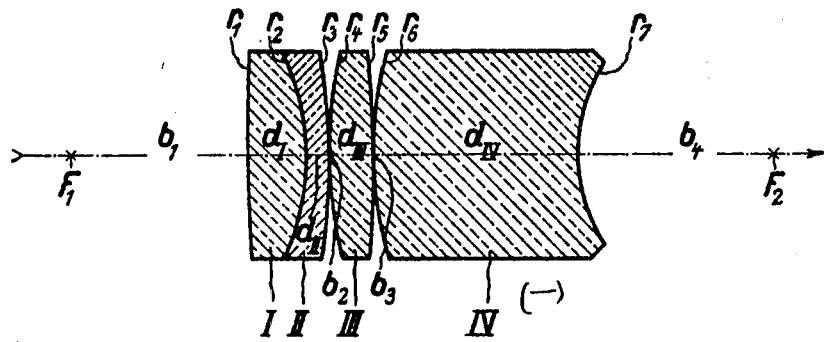
Focal length: 100
$r_1$ = + 696.0
$r_2$ = −  46.8
$r_3$ = − 122.0
$r_4$ = +  82.0
$r_5$ = − 384.0
$r_6$ = +  68.5
$r_7$ = +  32.0
$b_1$ = 191.0
$d_I$ =  10.9
$d_{II}$ =   4.6
$b_2$ =   0
$d_{III}$ =   9.1
$b_3$ =   0
$d_{IV}$ =  41.0
$b_4$ = 246.0
Inventor:
Albert König Patented Feb. 3, 1931

1,790,926

UNITED STATES PATENT OFFICE

ALBERT KÖNIG, OF JENA, GERMANY, ASSIGNOR TO THE FIRM OF CARL ZEISS, OF JENA, GERMANY

MICROSCOPE OBJECTIVE

Application filed February 7, 1929, Serial No. 338,255, and in Germany February 14, 1928.

The invention relates to slightly magnifying microscope objectives distinguishing themselves by a working distance which is long in proportion to the focal length. In order to obtain a spherical and chromatic correction for a sufficiently large ratio of aperture, according to the invention such objective may consist of at least two partial systems of which at least one has several members cemented together, when further the conditions are observed that the back partial system facing the image space is formed by a member of the shape of a meniscus, of which the concave side faces the image space, whereby the radius of the said concave side must be smaller than five times the thickness of the said member, and that further the remaining part of the objective has a collective effect. In order to obtain a correction as far as possible free from zonal errors, the said remaining part of the objective conveniently consists of two collecting partial systems which can be composed of single lenses or of such lenses which consist of several members cemented together. In order to do away as far as possible with the astigmatism outside the axis it is of advantage to arrange all partial systems composed of several members cemented together in such a way that the member facing the image space acts as dispersing lens. With the said image-forming defects well corrected a specially simple form of the objective is attained when abiding by the objective composed of three partial systems of which the middle one is constructed as single lens and the other one which is facing the object as lens composed of two members cemented together.

The accompanying drawing represents in a longitudinal section an example of a microscope objective corresponding to the invention.

The objective shown in the drawing consists of a collective lens having a collective and a dispersive member, I and II, respectively, which are cemented together, of a collective lens III and of a dispersive lens IV. The foci of the system are designated by figures $F_1$ and $F_2$. The system affords a two-fold magnification and has a numeric aperture of 0.12. In the appertaining tables the values for the radii $r$, the distances $b$, and the thicknesses $d$, refer to a focal length of the system of 100 units.

| Radii | Thicknesses and distances |
|---|---|
| $r_1 = +696.0$ | $b_1 = 191.0$ |
| $r_2 = -46.8$ | $d_I = 10.9$ |
| $r_3 = -122.0$ | $d_{II} = 4.6$ |
| $r_4 = +82.0$ | $b_2 = 0$ |
| $r_5 = -384.0$ | $d_{III} = 9.1$ |
| $r_6 = +68.5$ | $b_3 = 0$ |
| $r_7 = +32.0$ | $d_{IV} = 41.0$ |
| | $b_4 = 246.0$ |

| Kinds of glass | | | | |
|---|---|---|---|---|
| | I | II | III | IV |
| $n_D$ | 1.5311 | 1.7174 | 1.5311 | 1.6088 |
| $\nu$ | 62.1 | 29.5 | 62.1 | 58.9 |

I claim:

1. A slightly magnifying microscope objective for long working distance consisting of at least two partial systems of which at least one contains several members cemented together, the partial system facing the image space being a meniscus of which the concave side faces the image space, the radius of curvature of this side being smaller than three times the thickness of the said meniscus, and the remaining part of the objective having a collective effect.

2. A slightly magnifying microscope objective for long working distance consisting of three partial systems of which at least one contains several members cemented together, the two front partial systems being collecting partial systems and the partial system facing the image space being a meniscus of which the concave side faces the image space, the radius of curvature of this side being smaller than three times the thickness of the said meniscus.

3. A slightly magnifying microscope objective for long working distance consisting of three partial systems of which at least one contains several members cemented together, the two front partial systems being collecting partial systems and the partial system facing the image space being a meniscus of which the concave side faces the image space, the radius of curvature of this side being smaller than three times the thickness of the said meniscus, and of those partial systems which consist of several members cemented together, the member facing the image space having a dispersive effect.

4. A slightly magnifying microscope objective for long working distance consisting of three partial systems, the partial system facing the image space being a single meniscus of which the concave side faces the image space, the radius of curvature of this side being smaller than three times the thickness of the said meniscus, the front partial system facing the object being a collecting lens consisting of two members cemented together, and the middle partial system being a single collecting lens.

ALBERT KÖNIG.